US009141881B2

(12) United States Patent
Jiang et al.

(10) Patent No.: US 9,141,881 B2
(45) Date of Patent: Sep. 22, 2015

(54) METHOD AND APPARATUS OF CLASSIFICATION AND OBJECT DETECTION, IMAGE PICKUP AND PROCESSING DEVICE

(71) Applicant: CANON KABUSHIKI KAISHA, Tokyo (JP)

(72) Inventors: Yong Jiang, Beijing (CN); Wenwen Zhang, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 13/778,718

(22) Filed: Feb. 27, 2013

(65) Prior Publication Data
US 2013/0223726 A1  Aug. 29, 2013

(30) Foreign Application Priority Data
Feb. 29, 2012  (CN) .......................... 2012 1 0049918

(51) Int. Cl.
*G06K 9/00* (2006.01)
*G06K 9/62* (2006.01)
*G06N 99/00* (2010.01)

(52) U.S. Cl.
CPC ............ *G06K 9/6217* (2013.01); *G06K 9/6287* (2013.01); *G06N 99/005* (2013.01)

(58) Field of Classification Search
CPC ........ G06K 9/6267–9/6287; G06K 9/62–9/70; G06K 9/00288; G06K 9/6256; G06K 9/66; G06K 9/6127; G06K 9/6282; G06F 17/30256
USPC .......................................................... 382/159
See application file for complete search history.

(56) References Cited

U.S. PATENT DOCUMENTS

2009/0060290 A1\*  3/2009  Sabe et al. ..................... 382/118
2011/0267964 A1\*  11/2011  Baltatu et al. .................. 370/242
2013/0279795 A1\*  10/2013  Shlain et al. ................... 382/149

OTHER PUBLICATIONS (Jian Fu, "Effects of Hypersoidal Decision Surfaces on Image Segmentation in Artificial Color", 2010, Journal of Electronic Imaging 19(2)).*
(Xiaodong Yu, "Support Vector Data Description for Image Categorization From Internet Images",2008, IEEE).*
(Subhransu Maji, "Classification Using Intersection Kernel Support Vector Machines is Efficient", 2008, IEEE).*
(Shigeo Abe, "Support Vector MAchines for Pattern Classification", Chapter 4, 2010, Springer-Verlad London Limited).*
Mary M. Moya, et al., "Network Constraints and Multi-Objective Optimization for One-Class Classification," Neural Networks, vol. 9, No. (3), pp. 463-474. doi: 10.1016/ 0893-6080(95)00120-4, 1996.

(Continued)

*Primary Examiner* — Stephen R Koziol
*Assistant Examiner* — Totam Le
(74) *Attorney, Agent, or Firm* — Canon USA, Inc. IP Division

(57) ABSTRACT

A maximum hypersphere is created in the feature space according to support vectors, wherein the support vectors are one or more feature vectors in a feature space. A center of the created maximum hypersphere is calculated according to the support vector(s). A decision hyper sphere is created with the same center as the calculated center of the created maximum hypersphere. Feature vector(s) are classified within the decision hypersphere, as positive feature vector(s). False positive rate is kept to a predetermined level to provide effective object detection.

19 Claims, 12 Drawing Sheets

(56) References Cited

OTHER PUBLICATIONS

Vittorio Ferrari et al., "Learning Visual Attributes," In NIPS, 2008.
L. Fei Fei et al., "A Bayesian Approach to Unsupervised One-Shot Learning of Object Categories," In ICCV, pp. 1134-1141, 2003.
Michael S. Lew et al., "Content-Based Multimedia Information Retrieval: State of the Art and Challenges," ACM Trans. MCCA, 2006.
John Eakins et al., "Content-Based Image Retrieval," University of Northumbria at Newcastle, Oct. 1999.
Hae Jong Seo et al. "Training-Free, Generic Object Detection Using Locally Adaptive Regression Kernels," pp. 1-35, Mar. 10, 2009.
David G. Lowe, "Object Recognition From Local Scale-Invariant Features," ICCV. pp. 1-8, 1999.
Herbert Bay et al., "Speeded-Up Robust Features (SURF)," CVIU, pp. 346-359, 2008.
Eric Nowak et al., "Sampling Strategies for Bag-of-Features Image Classification," ECCV, 2006, Part IV, LNCS 3954, pp. 490-503.
Hiroshi Okada et al.; "A Note on SVDD Based Automatic Target Object Extraction for Image Retrieval;" Graduate School of Information Science and Technology, Hokkaido University; Technical Report, Aug. 3, 2009, vol. 33, No. 33, pp. 12-16.
Takahiro Ogawa et al.; "A Note on Adaptive Resolution Enhancement of Still Images Based on SVDD;" Graduate School of Information Science and Technology, Hokkaido University; IEICE Technical Report, Jan. 28, 2009; vol. 108, No. 425; pp. 269-274.

* cited by examiner

--PRIOR ART--

--PRIOR ART--

METHOD AND APPARATUS OF CLASSIFICATION AND OBJECT DETECTION, IMAGE PICKUP AND PROCESSING DEVICE

BACKGROUND OF THE INVENTION

1. Field of the Invention

The present invention relates to the field of image processing and pattern recognition, and more specifically, to a method and apparatus for training a classifier to perform object detection.

2. Description of the Related Art

With the development of computer image processing technology and the wide application of the principle of computer vision, it has become more and more popular to locate an object in real time from images and videos through object detection technology. Object detection technology has a wide practical value in applications, such as smart terminal devices, smart traffic systems, smart monitoring systems, or even in military object detection.

In the field of object detection, classifiers trained by the one-class methods are widely employed. As described in "Network constraints and multi-objective optimization for one-class classification," Moya, M and Hush, D. (Neural Networks, 9(3):463-474. doi: 10.1016/0893-6080(95) 00120-4, 1996), in a one-class classifier, through learning from a training set containing merely one class of objects, that class of objects can be distinguished from all of other possible objects. For example, classifiers targeted to face/cat/dog can be embedded in cameras.

Unfortunately, such existing one-class classifiers cannot meet the requirements of consumers more and more. Taking cameras as an example, a user tends to regularly take pictures for a certain object, such as his pet. This means that, instead of a classifier like a conventional one, that is, a classifier merely aimed to a certain class of objects such as face/cat/dog, a classifier is desired by such a user, which is capable of learning appearance features of an object specified by the user himself (such as, his pet). For example, a user may want to focus automatically on his pet when he is raising his camera or want to find photos about his pet from all photos taken by his camera.

Currently, most of the existing object detection products rely on the collection of sufficient samples to obtain an appropriately trained classifier, which is then provided in those products for achieving object location. However, in some practical applications, it may be difficult to collect enough samples to train a classifier. For example, when tracing a specific vehicle through a traffic monitoring system, there may be very few prior samples about the specific vehicle, or even only one sample available. Further, in customer products, it is not impractical to simply rely on users to collect plenty of samples, which may lead to poor user experience.

Thus, an object detection method is desired, which: (1) does not rely on any prior knowledge, because the number of possible object categories is so huge, and their distributions may obey the long-tail theory, it is virtually impossible to prepare previously-learnt dictionaries which cover those possible object categories; (2) is capable of performing detection using only one or several samples, while being able to handle appearance variances of an object at the same time, such as lighting, view point, deformation, blurring, rotation, etc.; (3) is distinctive enough to separate an object from all of other objects of the same category, for example, capable of distinguishing a dog of a user from other users' dogs.

Object detection method in the prior art can not meet the above requirements. For example, a concept of "attribute" is disclosed in V. Ferrari and A. Zisserman, "Learning Visual Attributes" (In NIPS, 2008), but it requires end users to identify object attributes.

In L. Fei-Fei, R. Fergus and P. Perona "A bayesian approach to unsupervised one-shot learning of object categories" (In ICCV, pages 1134-1141, 2003), a one shot learning method is disclosed. In M. Lew "Content-based Multimedia Information Retrieval: State of the Art and Challenges" (ACM Trans. MCCA, 2006), and J. Eakins and M. Graham "Content-based Image Retrieval" (University of Northumbria at Newcastle), a content-based image retrieval method is disclosed, both of which do not have enough accuracy to distinguish an object from other objects of the same category.

In Hae Jong Seo and Peyman Milanfar, "Training-Free Generic Object Detection Using Locally Adaptive Regression Kernels" (IEEE Trans. PAMI, vol. 32, no. 9, pp. 1688-1704, 2010), a training-free LARK based detection method is disclosed, which however has no rotation invariance and poor intra-class discrimination.

SIFT/SURF based local points matching methods are disclosed in Lowe, David G, "Object recognition from local scale-invariant features" (ICCV. pp. 1150-1157, 1999), and H. Bay, A. Ess, T. Tuytelaars and L. V. Gool, "SURF: Speeded Up Robust Features" (CVIU, pp. 346-359, 2008). In E. Nowak, F. Jurie and B. Triggs, "Sampling Strategies for Bag-of-Features Image Classification" (ECCV, 2006), a BOW/Part-based model is disclosed. Those methods are not good at processing very small target and handling non-rigid object distortions.

Various methods in the prior art as described above cannot provide satisfied detection performance with fewer samples. Thus, a method and apparatus capable of realizing object detection with high robustness and high discrimination using merely fewer samples is highly desirable.

SUMMARY OF THE INVENTION

The bottleneck for training an effective classifier through using merely one or several samples is how to control the performance of a classifier, that is, robustness and discrimination, in the case of fewer samples available. In other words, a classifier is required to be able to not only guarantee the coverage of all appearance variances of a target object, but also distinguish a target object from other objects of the same category accurately. However, in the case of there are only fewer samples available, samples may have a too limited diversity to cover all possible appearance variances of a target objects, such as lighting, view point, deformation, blurring, rotation, etc., as shown in FIG. 1. It is one of the reasons of why enough samples are necessary to train a classifier in the prior art.

In order to solve the above problems, novel classification learning method and apparatus are provided in this invention. The classification learning method and apparatus may estimate a decision hypersphere based on support vectors as a classification threshold, wherein the decision hypersphere substantially does not vary regardless of what or how many the samples are. Namely, any positive sample has a substantially fixed probability of falling within the decision hypersphere.

According to an aspect of the present invention, provided is a classification method in a feature space including one or more feature vectors, all of or some of the feature vectors being identified as support vector(s), comprising: a maximum hypersphere creation step for creating a maximum hypersphere in the feature space according to the support vector(s); a center calculation step for calculating a center of the created maximum hypersphere, according to the support vector(s); a decision hypersphere creation step for creating a decision hypersphere with the same center as the calculated center of the created maximum hypersphere; and a classification step for classifying feature vector(s) within the decision hypersphere as positive feature vector(s).

Other features and advantages of this invention will become more apparent from the following description given with reference to accompanying drawings.

BRIEF DESCRIPTION OF THE DRAWINGS

The drawings incorporated in the specification and forming a part thereof illustrate embodiments of this invention, and together with the description, are used to illustrate the principle of this invention.

DESCRIPTION OF THE EMBODIMENTS

Figure 1:
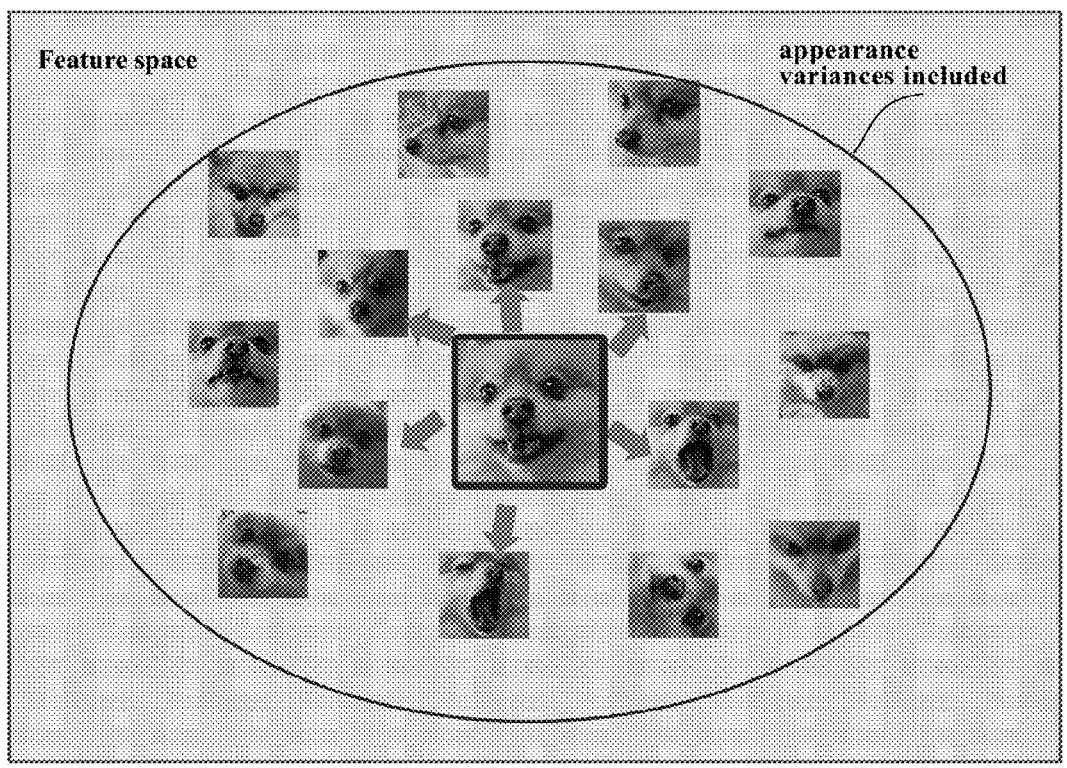
FIG. 1 is a schematic diagram showing possible appearance variances of an exemplary target object.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

As mentioned above, in order to realize object detection with high robustness and high discrimination using only fewer samples, there is a need to provide a classifier capable of not only covering substantially all appearance variations of a target object, but also distinguishing a target object from other objects of the same category with a sufficient accuracy.

Figure 2A:
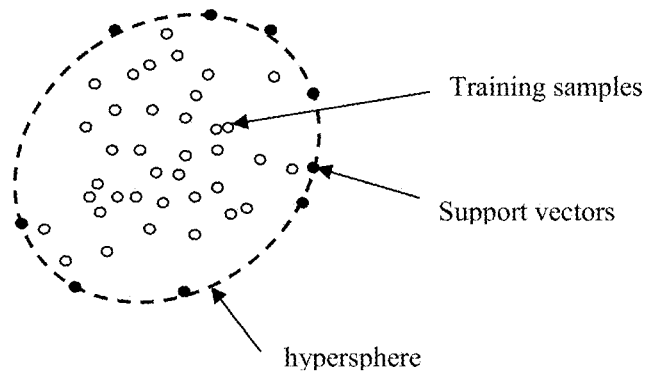
FIG. 2A is a schematic diagram showing a Support Vector Data Description (SVDD) method in the prior art.

The Support Vector Data Description (SVDD) method is a key technique of one-class classification methods. As described in D. Tax and R. Duin, "Support vector domain description" (Pattern Recognit. Lett., vol. 20, pp. 1191-1199, 1999), the SVDD method aims to find a sphere with a minimum volume enabling to enclose as many training samples as possible. FIG. 2A shows a schematic diagram for the description of the SVDD method. In a feature space as shown in FIG. 2A, hollow circles (○) represent feature vectors corresponding to training samples, solid circles (●) represent support vectors which are located on the boundary of a sphere. As shown in the figure, those support vectors define a hypersphere obtained in the SVDD method, i.e., a threshold of a SVDD classifier is determined. In other words, the aim of the SVDD method is to obtain support vectors as shown in the figure.

Figure 2B:
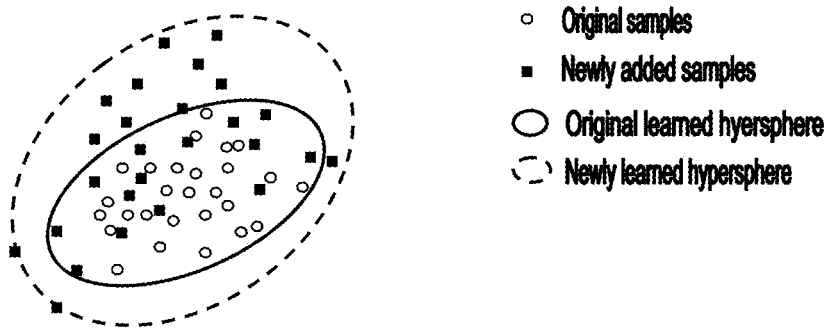
FIG. 2B schematically shows a threshold versus a number of samples according to a SVDD classification method in the prior art.

The performance and accuracy of conventional SVDD-based object detection method rely on the availability of training samples. FIG. 2B schematically shows a threshold versus a number of samples according to a SVDD-based classification method in the prior art. In FIG. 2B, hollow circles (○) represent original training samples, and solid squares (■) represent newly added training samples; a solid surrounding line represents a SVDD hypersphere obtained based on original training samples, and a dashed surrounding line represents a SVDD hypersphere obtained after new training samples have been added.

It can be seen from FIG. 2B, in the case of fewer training samples, training samples generally have a lower diversity such that the SVDD hypersphere defining the classifier threshold is smaller, as shown by the solid surrounding line in FIG. 2B. Obviously, in such a case, the trained classifier is unable to recognize many appearance variations of a target object, i.e., suffer from a very low detection rate, possibly leading to failed object detection. For example, in online applications, such as video monitoring, image retrieval, etc, because of the lack of enough training samples in the original state, conventional classification methods are unable to detect target objects due to their low detection rate.

With the increase of the number of samples, the SVDD hypersphere may be continuously enlarged, that is, the threshold of the classifier may increase, as shown by the dashed surrounding line in FIG. 2B. In the case of an enlarged hypersphere, detection rate may be improved, however, with increased false positive rate, namely higher probability of determining a negative sample as a positive sample. Thus, conventional SVDD-based object detection methods have unstable performance, and can not operate with few samples.

As described with respect to FIG. 1, in a feature space of samples, a sample (e.g., training samples as represented by solid squares of FIG. 1) merely occupy a very small area or can be characterized as a feature vector, while appearance variations of that sample may occupy a larger area around the sample. In order to detect all possible appearance variations according to merely one or several samples, it is necessary to estimate the area occupied by the appearance variations, that is, the area indicated by a solid elliptical line of FIG. 1.

Figure 3A:
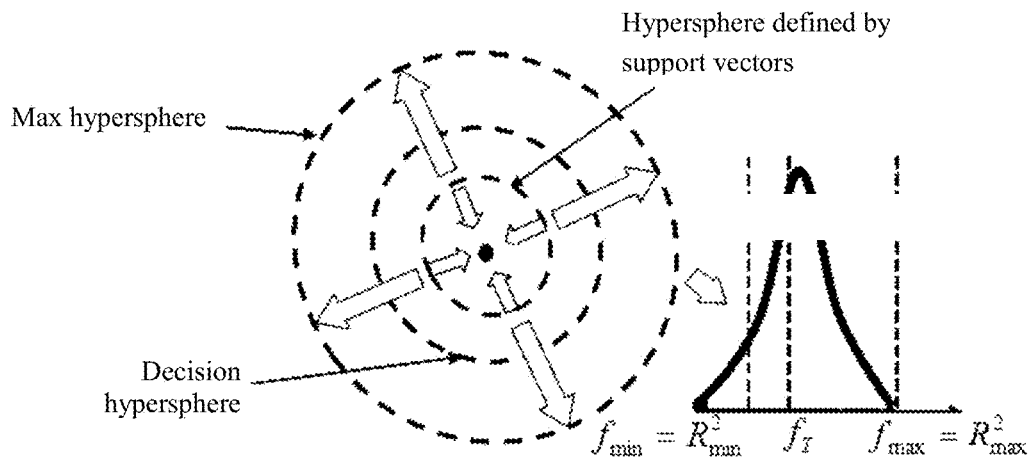
FIG. 3A is a schematic diagram showing the principle of a classification method according to this disclosure.

In order to appropriately estimate the area occupied by the appearance variations of a target object in the feature space, in this invention, as shown in FIG. 3A, first, a maximum hypersphere (with a radius $R_{max}$) occupied by appearance variations is created based on support vectors; then, a center of the maximum hypersphere is estimated, for example, a minimum hypersphere (with a radius $R_{min}$) is estimated, so that a center of the hypersphere is estimated; finally, with the maximum hypersphere and the estimated center, a decision hypersphere (with a radius $R_T$) is created according to a statistical probability, as a threshold of a classifier. No matter how many samples are, the created decision hypersphere is substantially fixed in size. A distribution of $f=R^2$ in the range of $[R_{min}^2, R_{max}^2]$ is shown schematically in FIG. 3A on its lower right corner.

Figure 3B:
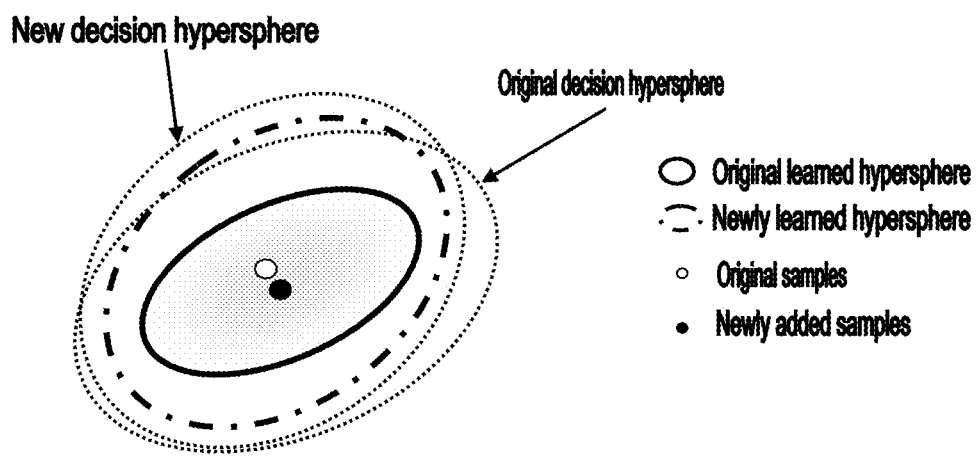
FIG. 3B schematically shows a threshold versus a number of samples according to the classification method of this disclosure.

As shown in FIG. 3B, after having new training samples added, although the hypersphere defined by the support vectors is notably enlarged (as shown by the solid and dashed lines in FIG. 3B), the newly created decision hypersphere has substantially the same size as the original decision hypersphere (as shown by two dotted lines of FIG. 3B). A detail description of how to create a decision hypersphere based on support vectors will be given below.

Note that although how to train a classifier is discussed taking SVDD as an example in this disclosure, those skilled in the art should understand that the classification method of this disclosure also can be applied to classifiers based on Support Vector Machine (SVM).

Figure 4:
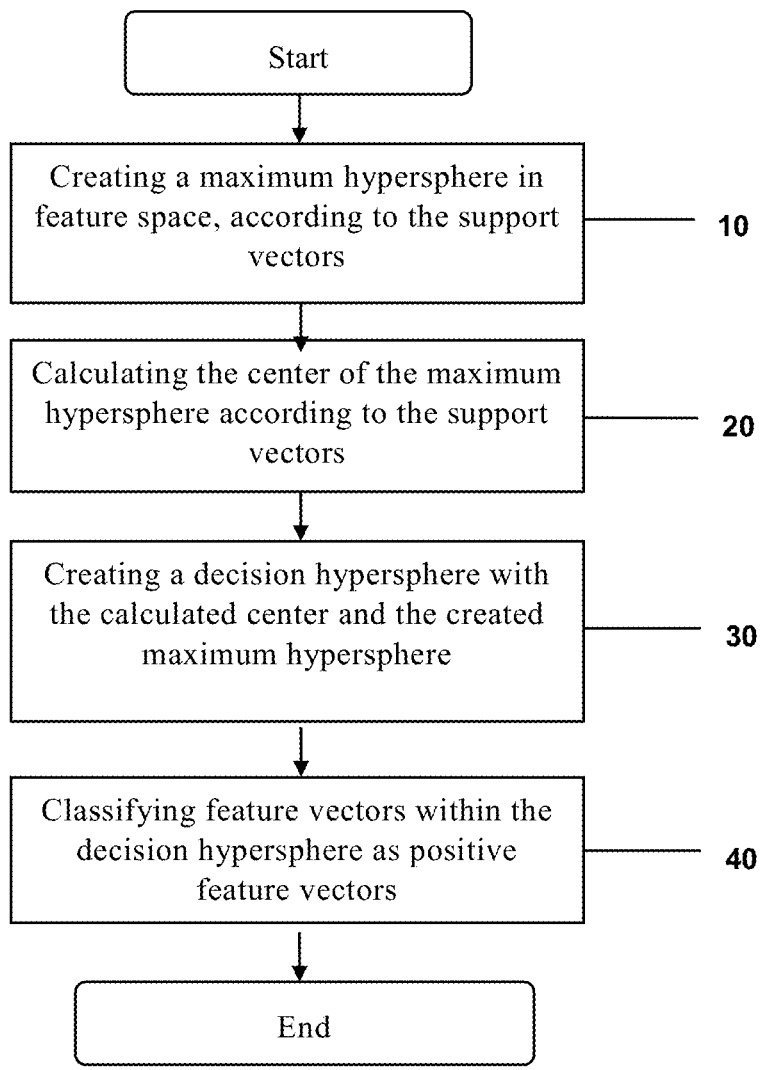
FIG. 4 is a flowchart illustrating the classification method according to embodiments of this disclosure.

FIG. 4 shows a flowchart of a classification method according to embodiments of this disclosure. After obtaining target training samples, a feature space is constructed for those samples. Then, the boundary of a maximum hypersphere capable of enclosing as many training samples as possible is obtained through the SVDD method. That is, support vectors are determined in the feature space. Therefore, a maximum hypersphere in the feature space is created according to the determined support vectors (step 10, also be referred to as maximum hypersphere creation step).

The determination of a hypersphere based on the SVDD method can be expressed as follows:

$$\min R^2 + C\Sigma_i \xi_i \; s.t. \; \|x_i - a\|^2 \le R^2 + \xi_i \text{ and } \xi_i \ge 0 \quad (1)$$

wherein $\alpha$ is the center of a hypersphere, R is the radius of the hypersphere, C is a penalty factor, $\xi_i$ is a slack error, and $x_i$ represents a support vector defining the hypersphere.

Applying Lagrangian multiplier to Equation (1), a dual problem can be obtained as follows:

$$\min \Sigma_{i,j} \alpha_i \alpha_j K(x_i \cdot x_j) - \Sigma_i \alpha_i K(x_i \cdot x_i) \; s.t. \; 0 \le \alpha_i \le C \text{ and } \Sigma_i \alpha_i = 1 \quad (2)$$

wherein $K(\bullet)$ is a kernel function with non-negative function values. In this description, the kernel function $K(\bullet)$ is selected so that it is constant for any normalized feature vector z in the feature space, that is, $K(z,z)$ is fixed.

In one embodiment, a Histogram Intersection Kernel (HIK) function can be selected (see http://c2inet.sce.ntu.edu.sg/Jianxin/projects/libHIK/libHIK_v2.pdf for details):

$$K_{HI}(T, Q) = \sum_{i=1}^{N} \min(T_i, Q_i) \quad (3)$$

wherein T and Q are feature histograms, and N is the dimension of the histograms.

Note that although a description is given in this embodiment taking the HIK function of Equation (3) as an example, those skilled in the art should appreciate that Hellinger's kernel functions and Jensen-Shannon kernel functions can be selected.

Through the solution of the dual optimization problem of Equation (2), a set of support vectors $x_i \in SVs$ and corresponding weights $\alpha_i$ are obtained.

From the support vector $x_i$ and weight $\alpha_i$ obtained through the above SVDD method, the radius $R_{max}$ of a maximum hypersphere can be calculated. As to a normalized feature vector z, the distance to the center of the hypersphere can be calculated as follows:

$$f(z) = R_z^2 = K(z, z) - 2\sum_{x_i \in SVs} \alpha_i K(x_i, z) + \sum_{x_i \in SVs} \sum_{x_j \in SVs} \alpha_i \alpha_j K(x_i, x_j) \quad (4)$$

if $f(z) = R_z^2 \ge R^2$, the feature vector z is within the hypersphere, and can be classified into a target object category.

In order to solve the radius $R_{max}$ of the maximum hypersphere, according to Equation (4) above, we can obtain:

$$\begin{aligned} f_{max} &= R_{max}^2 \\ &= \max(f(z)) \\ &= K(z, z) - 2\min\left(\sum_{x_i \in SVs} a_i K(x_i, z)\right) + \\ &\quad \sum_{x_i \in SVs} \sum_{x_j \in SVs} a_i a_j K(x_i, x_j) \end{aligned} \quad (5)$$

As mentioned previously, for an arbitrary normalized feature vector z, $K(z,z)$ is fixed. Where a support vector $x_i \in SVs$ and a corresponding weight $\alpha_i$ are calculated according to Equation (2), $$\sum_{x_i \in SVs} \sum_{x_j \in SVs} a_i a_j K(x_i, x_j)$$

has a fixed value. Thus, the key to solve $f_{max}$ is to obtain the minimum value of $$\sum_{x_i \in SVs} a_i K(x_i, z).$$

As described above, the kernel function $K(\bullet)$ is non-negative, thus $$\min\left(\sum_{x_i \in SVs} a_i K(x_i, z)\right) = 0.$$

Hence, Equation (5) can be simplified as:

$$f_{max} = R_{max}^2 \qquad (6)$$
$$= K(z, z) + \sum_{x_i \in SVs} \sum_{x_j \in SVs} a_i a_j K(x_i, x_j)$$

Thus, the radius $R_{max}$ of a maximum hypersphere is determined by Equation (6) above.

Next, referring to step 20, also be referred to as center calculation step, of FIG. 4, a center of the maximum hypersphere is calculated according to the support vectors, that is, a minimum distance $f_{min}$ is determined.

Figure 5:
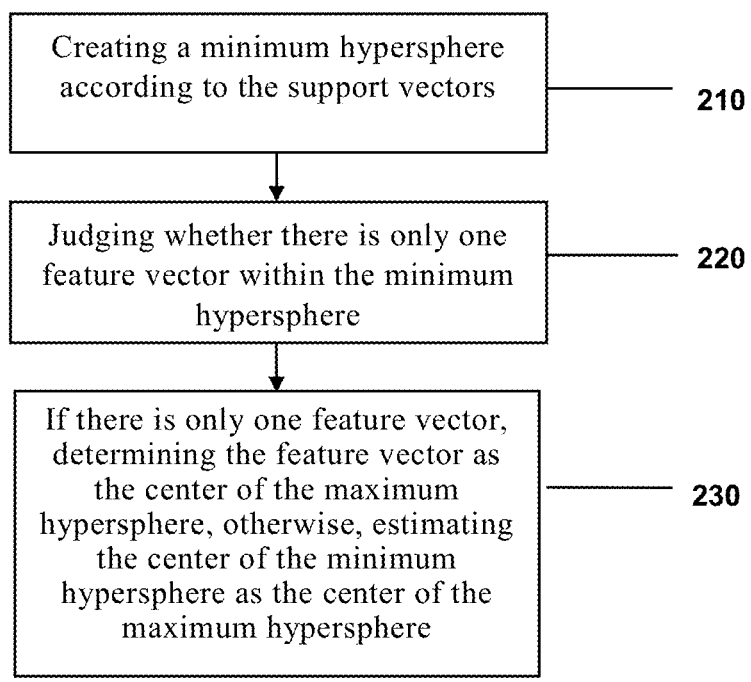
FIG. 5 is a flowchart illustrating a center calculation step according to embodiments of this disclosure.

FIG. 5 is a flowchart illustrating an specific implementation of the center calculation step according to embodiments of this disclosure. As shown in FIG. 5, first, according to the support vectors calculated based on Equation (2), a minimum hypersphere in the feature space is created (step 210). According to Equation (4) above, the minimum distance $f_{min}$ can be expressed as follows:

$$f_{min} = R_{min}^2 \qquad (7)$$
$$= \min(f(z))$$
$$= K(z, z) - 2\max\left(\sum_{x_i \in SVs} \alpha_i K(x_i, z)\right) +$$
$$\sum_{x_i \in SVs} \sum_{x_j \in SVs} a_i a_j K(x_i, x_j)$$
$$= f_{max} - 2\max\left(\sum_{x_i \in SVs} \alpha_i K(x_i, x_j)\right)$$

As described above, under the condition that all support vectors have been determined, for an arbitrary normalized feature vector z, $f_{min}$ is fixed. Thus, solving $f_{min}$ can be transformed into solving the maximum of $$\sum_{x_i \in SVs} \alpha_i K(x_i, z).$$

It can be known from the definition of kernel function, $$\max\left(\sum_{x_i \in SVs} \alpha_i K(x_i, z)\right)$$

must be a specific value, but not be $+\infty$.

Next, it is determined whether there is only one feature vector within the minimum hypersphere (step 220), that is, whether there is only one feature vector z with a distance to the center of the hypersphere satisfying $f(z)=R_z^2 \leq R_{min}^2$. If there is only one feature vector z within the minimum hypersphere, it means that the feature vector is exactly the center of the minimum hypersphere and the maximum hypersphere. If there is more than one feature vectors within the minimum hypersphere, it is required to estimate the center of the minimum hypersphere as the maximum hypersphere (step 230), as will be described in detail hereinafter.

In this example, the HIK function is selected for description. In order to speedup the calculation, a lookup table lut is defined:

$$lut = \sum_{x_i \in SVs} \alpha_i K(x_i, z) \qquad (8)$$
$$= \sum_{j=1}^{N}\left(\sum_{i=1}^{M} \alpha_i \min(x_{ij}, z_j)\right) \leq \sum_{j=1}^{N}\sum_{i=1}^{M} \alpha_i x_{ij}$$

wherein, $x_{ij} \in X_i$, $X_i \in SVs$, M is the number of the support vectors and N is the dimension of the support vectors.

It can be known from Equation (8) above, $$lut \leq \sum_{j=1}^{N}\sum_{i=1}^{M} \alpha_i x_{ij},$$

but max(lut) is not always equal to $$\sum_{j=1}^{N}\sum_{i=1}^{M} \alpha_i x_{ij},$$

which will be described in detail below. When max(lut) can take $$\sum_{j=1}^{N}\sum_{i=1}^{M} \alpha_i x_{ij},$$

it means that only one feature vector is within the minimum hypersphere. In such a case, the feature vector can be determined as the center of the hypersphere, and it is determined that $$f_{min} = f_{max} - 2\sum_{j=1}^{N}\sum_{i=1}^{M} \alpha_i x_{ij}.$$

Figure 6:
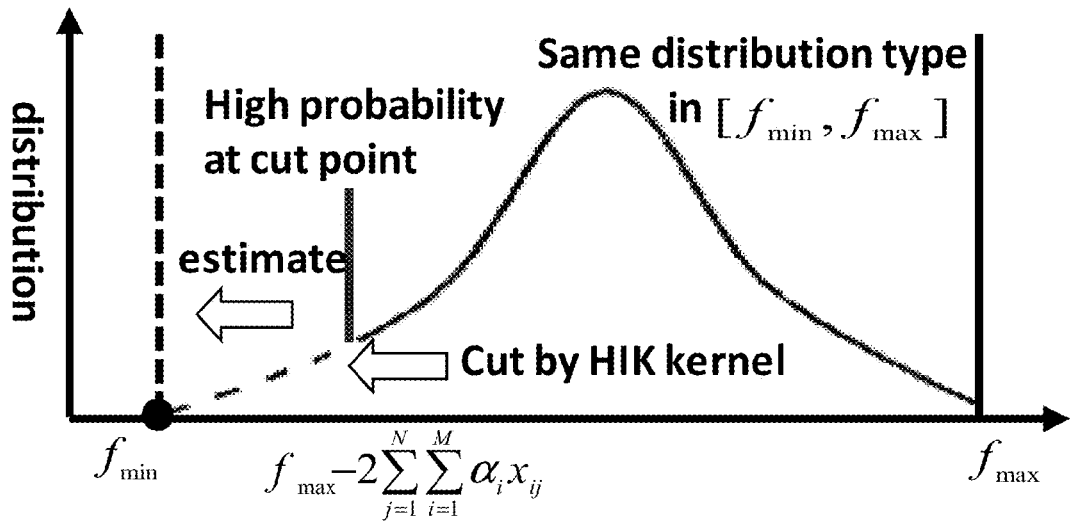
FIG. 6 illustrates how to determine whether there is only one feature vector in a minimum hypersphere according to embodiments of this disclosure.

Referring to FIG. 6, in the case that the number of feature vectors within the minimum hypersphere is more than one, $$f_{min} \neq f_{max} - 2\sum_{j=1}^{N}\sum_{i=1}^{M} \alpha_i x_{ij},$$

in which case, $f_{min}$ needs to be evaluated, that is, max(lut) needs to be evaluated.

In the example of the HIK kernel function, as to a j-th dimension, it is defined as:

$$H_j = \Sigma_{i=1}^{M} \alpha_i \min(x_{ij}, z_j), j=1,2,3 \ldots N \qquad (9)$$

The average value of $H_j$ defined as $\bar{h}$, and according to Equation (8), lut=$N\bar{h}$. Thus, as to a N-dimension feature vector $z_j$, estimation of the maximum of lut is equivalent to estimation of the maximum values of the average values of lut on N dimensions, i.e., estimating max($\bar{h}$). Below, the range of $\bar{h}$ will be estimated following the sample estimation theory in the field of statistics.

According to the central limit theorem, $\bar{h}$ obeys to a normal distribution in the sample space. Thus, the probability $\Phi_z$ is a cumulative distribution, particularly as follows:

$$\Phi_z = \frac{\left(\sum_{j=1}^N H_j\right)/N}{\left(\sum_{j=1}^N \max(H_j)\right)/N} \tag{10}$$

$$= \frac{\sum_{j=1}^N \sum_{i=1}^M \alpha_i \min(x_{ij}, z_j)}{\sum_{j=1}^N \sum_{i=1}^M \alpha_i x_{ij}}$$

According to the central limit theorem, $$\max(lut) = N\max(\bar{h}) = N(\mu + \lambda_z \sigma_e) \tag{11}$$

According to the standard error $\sigma_e = \sqrt{\sum_{j=1}^N (H_j^{max} - \mu)^2/N}$, $\mu = \sum_{j=1}^N H_j^{max}/N$ and the probability $\Phi_z$, $\lambda_z$ can be obtained from a look-up table of the standard normal cumulative distribution function, and the range of $\bar{h}$ is determined as $[\mu - \lambda_z \sigma_e, \mu + \lambda_z \sigma_e]$, after which $\max(\bar{h}) = \mu + \lambda_z \sigma_e$ is determined consequently.

Finally, substituting the result of Equation (11) into Equation (7), $f_{min}$ can be estimated.

Next, returning to FIG. 4, at step 30 (also be referred as decision hypersphere creation step), a decision hypersphere is created based on the calculated center and the created maximum hypersphere. For example, a decision hypersphere is created using $f_{min}$ calculated at step 20 and $f_{max}$ calculated at step 10, wherein the center of the decision hypersphere is the same as the calculated center of the created maximum hypersphere.

Figure 7:
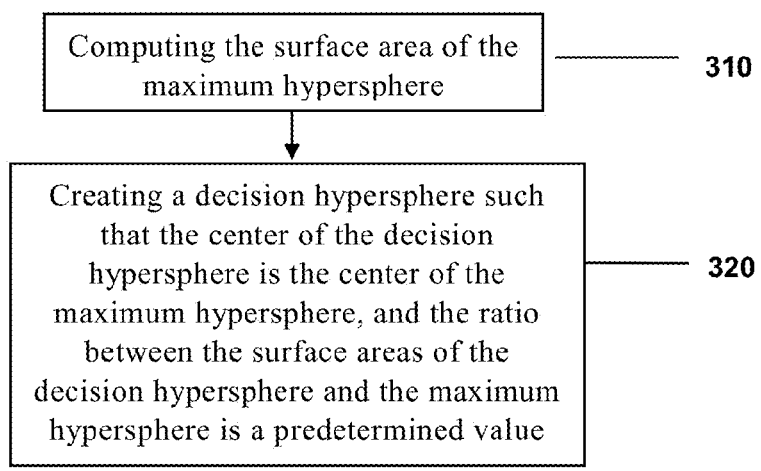
FIG. 7 is a flowchart illustrating a decision hypersphere creation step according to embodiments of this disclosure.

FIG. 7 is a flowchart illustrating a decision hypersphere creation step according to embodiments of this disclosure. Referring to FIG. 7, at step 310, the surface area of the maximum hypersphere is computed as:

$$\pi R_{max}^2 = \pi K(z, z) + \pi \sum_{x_i \in SVs} \sum_{x_j \in SVs} a_i a_j K(x_i, x_j) \tag{12}$$

$f(z)$ has substantially the same distribution type in the range of $[f_{min}, f_{max}]$. Below, assuming a parameter P, i.e., a predetermined value representing the radio of the surface area of the decision hypersphere and the surface area of the maximum hypersphere. Through using $R_{min}$ calculated at step 20 and $R_{max}$ calculated at step 10, the radius $R_T$ of the decision hypersphere is generated (step 320). The parameter P is defined as follows:

$$P = (f_T(z) - f_{min})/(f_{max} - f_{min}) \tag{13}$$

According to Equation (13), the radius $R_T$ of the decision hypersphere can be determined as:

$$f_T(z) = Pf_{max} + (1-P)f_{min} \tag{14}$$
$$\Rightarrow \pi R_T^2 = P\pi R_{max}^2 + (1-P)\pi R_{min}^2$$
$$\Rightarrow R_T^2 = PR_{max}^2 + (1-P)R_{min}^2$$

According to Equation (14), an appropriate threshold is estimated for a feature vector z, i.e. $f_T(z)$. Finally, $f_T$ is estimated for all support vectors $X_i \in SVs$:

$$f_T = \sum_{i=1}^M \alpha_i f_T(X_i) \tag{15}$$

$f_T$ is the threshold of the trained classifier. No matter how many or what the training samples are, the false positive rate of the classifier can be steadily inhibited below a level with the parameter P, that is, any positive feature vector has a fixed probability of being enclosed in the created decision hypersphere. Note that the parameter P itself does not represent the probability of any positive feature vector being enclosed in the decision hypersphere, however, for a given parameter P, the above probability is fixed.

Therefore, a decision hypersphere is created so that the center of the decision hypersphere is the calculated center of the maximum hypersphere and a ratio between the surface areas of the decision hypersphere and the maximum hypersphere is a predetermined value.

Last, as shown at step 40 (also to be referred as classification step) of FIG. 4, if a feature vector in the feature space is within the decision hypersphere, it is classified as a positive feature vector; otherwise, it is classified as a negative feature vector.

Figure 8:
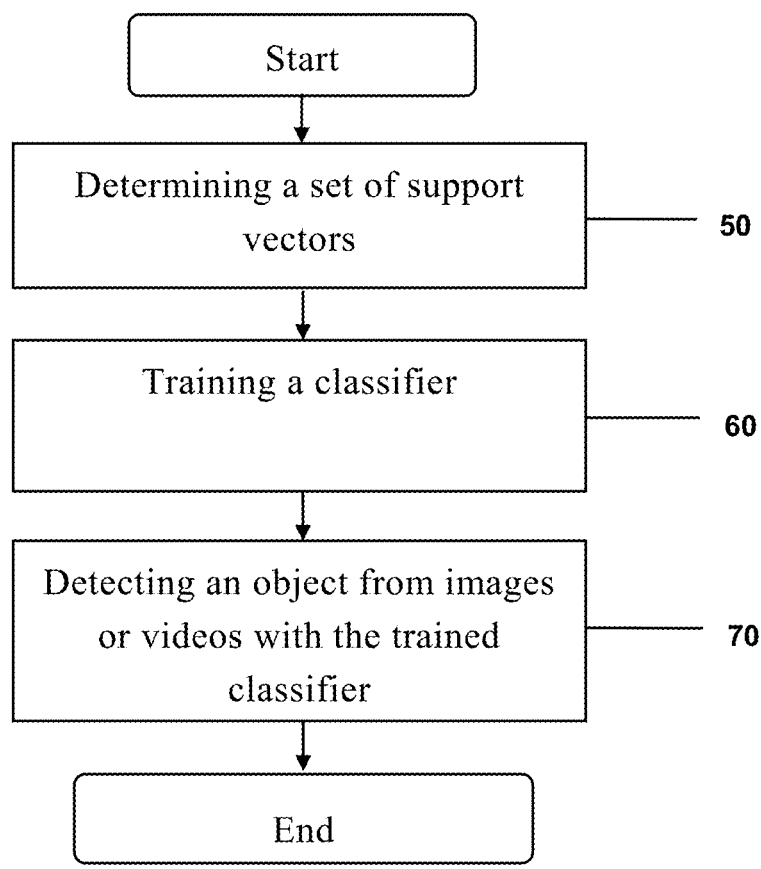
FIG. 8 is a flowchart illustrating an object detection method according to embodiments of this disclosure.

With the above classification method, object detection can be realized with high robustness and high discrimination through using merely few samples. FIG. 8 is a flowchart illustrating an object detection method according to embodiments of this disclosure.

First, at step 50 (to be referred as determination step), a set of support vectors are determined. In one embodiment, the set of support vectors is determined based on one or several received samples. In another embodiment, the set of support vectors are extracted from other trained classifiers.

In order to guarantee the high discrimination and robustness of a classifier to be trained, the number of the support vectors is kept above a predetermined level. In one example, the number of the support vectors is no less than 30. Because a feature vector generally corresponds to a sample, the number of samples is required no less than the predetermined value. In the case of the number of samples less than the predetermined value, a simulation operation is performed based on the available samples, until the set of samples is increased to a predetermined value. For example, a 3D distortion method described in "Information Visualization", M. Sheelagh, T. Carpendale, David J. Cowperthwaite, and F. David Fracchia (Simon Fraser University, 1997) can be used for sample simulation.

Next, a fixed probability parameter P is set, and a classifier is trained (i.e., learned) using the classification method described in FIG. 4, so as to obtain a classifier capable of keeping a stable detection performance despite of how many input samples are available (step 60, to be referred as training step).

Using the classifier trained at step 60, an object can be detected from an image or video (step 70, to be referred as detection step). Firstly, a number of partial regions are generated from the image or video frame. In one embodiment, a search window having the same size as a positive sample is set at first. Then, the search window is progressively moved across the image or video frame to extract pixels contained within the search window and create a portion of an input image. After moving the search window around the whole input image, the input image is resized. The resizing and moving steps are repeated until a predetermined value is reached. Secondly, a feature vector is extracted from each of the generated partial regions, and is inputted to a trained classifier. Finally, partial regions having positive samples detected therein are recorded and the sizes and locations of the object are grouped. Thereby, object detection can be realized with high robustness and high discrimination using few samples.

Figure 9A:
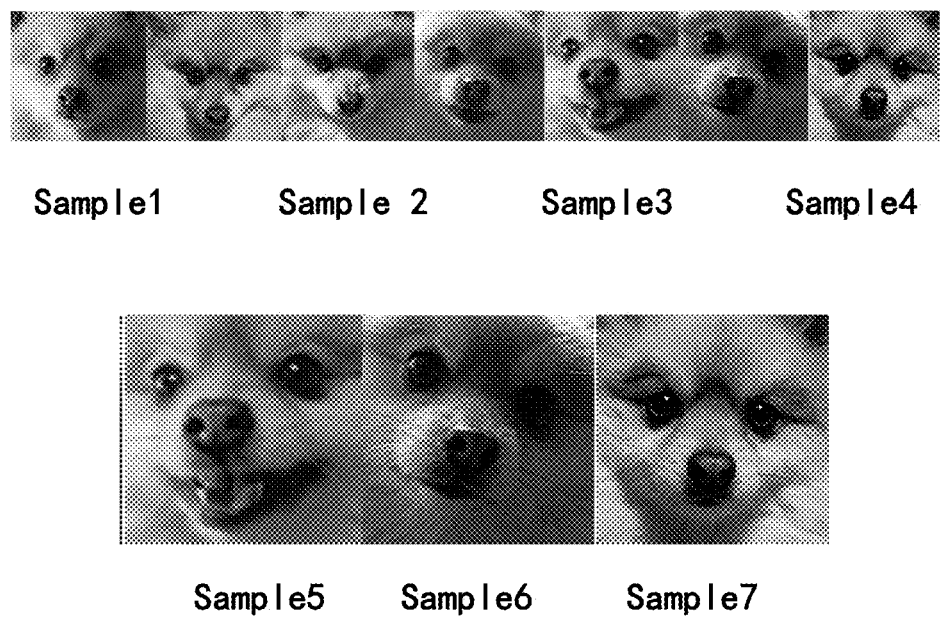
FIG. 9A and FIG. 9B show an example of identifying an object with the object detection method according to embodiments of this disclosure.
Figure 9B:
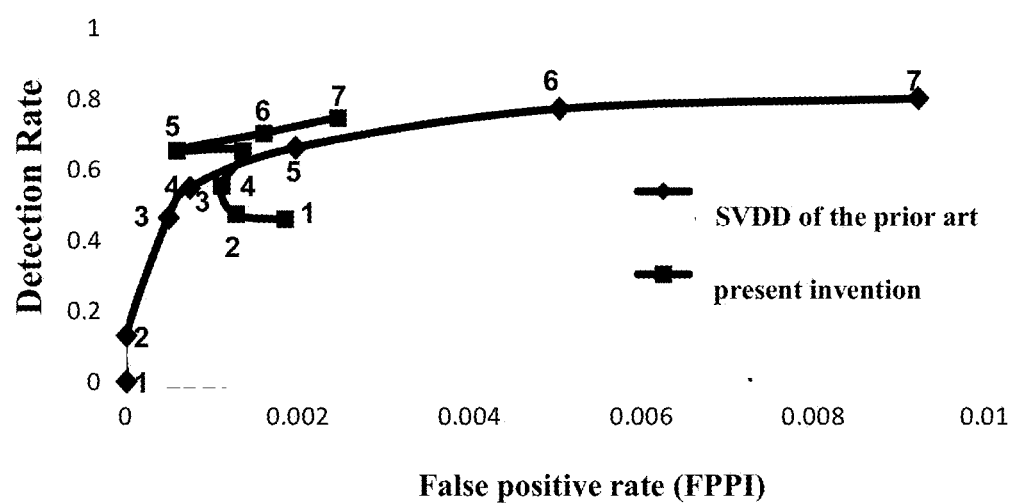

FIGS. 9A and 9B show an example of identifying an object with the object detection method of the embodiments of this disclosure. The seven videos about a same Pomeranian dog in different situations, such as backgrounds, lighting conditions and view points, etc are selected for a test. One training sample is selected from each of these videos, as shown in FIG. 9A. FIG. 9B shows the performance difference between the method of this invention and a SVDD-based method in the prior art, wherein the horizontal axis represents the false positive rate of each image, i.e., the probability of judging a negative sample as a positive one by error; the vertical axis represents detection rate, that is, the probability of detecting a positive sample. The lower the false positive rate is, and the higher the detection rate is, the better performance the object detection method may have. It can be seen from FIG. 9B, for the state-of-the-art method, its false positive rate increases with the increase of sample number, while in the present invention, false positive rate is substantially stable. Further, the state-of-the-art method has a very low detection rate when there are fewer samples available, while the detection rate of the method of this invention can be always kept at a higher level.

Figure 10:
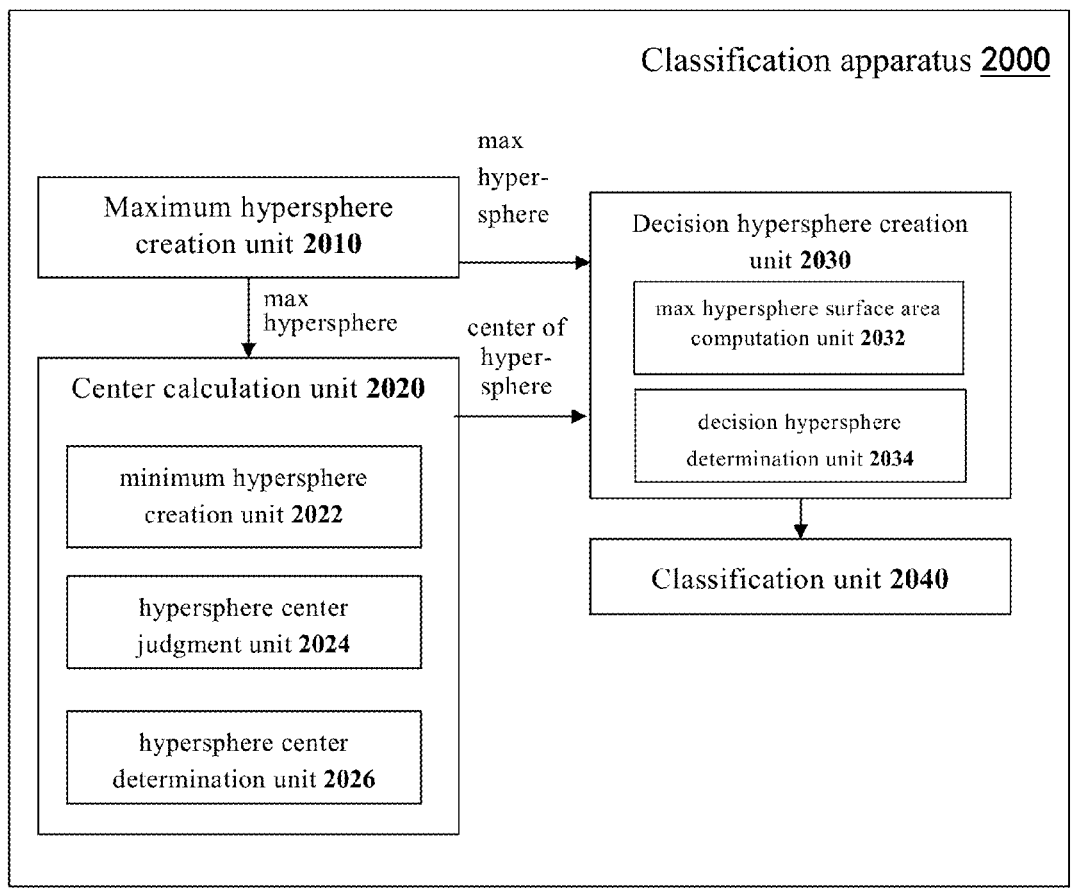
FIG. 10 is a functional block diagram showing a classification apparatus according to embodiments of this disclosure.

FIG. 10 shows a functional block diagram of a classification apparatus 2000 according to embodiments of this disclosure. The function modules of the classification apparatus 2000 may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

The classification apparatus 2000 is able to recognize positive feature vectors in a feature space. The feature space may comprise one or more feature vectors. In one embodiment, support vectors can be determined through a SVDD method based on feature vectors of input samples. In another embodiment, support vectors can be extracted from other trained classifiers.

The classification apparatus 2000 may comprises a maximum hypersphere creation unit 2010, a center calculation unit 2020, a decision hypersphere creation unit 2030, and a classification unit 2040.

The maximum hypersphere creation unit 2010 may create a maximum hypersphere in the feature space according to the support vectors. The center calculation unit 2020 may, according to the support vectors, calculate the center of the maximum hypersphere created by the maximum hypersphere creation unit 2010. The decision hypersphere creation unit 2030 may create a decision hypersphere based on the center calculated by the center calculation unit 2020 and the maximum hypersphere created by the maximum hypersphere creation unit 2010. The decision hypersphere is just the threshold of the classification apparatus 2000. The classification unit 2040 may classify feature vectors within the decision hypersphere created by the decision hypersphere creation unit 2030 as positive feature vectors. In one embodiment, the decision hypersphere is created such that any positive feature vector has a fixed probability of falling within the created decision hypersphere.

In one embodiment, the center calculation unit 2020 may further comprise a minimum hypersphere creation unit 2022, a hypersphere center judgment unit 2024, and a hypersphere center determination unit 2026. The minimum hypersphere creation unit 2022 may create a minimum hypersphere in the feature space according to the support vectors. The hypersphere center judgment unit 2024 can judge whether there is only one feature vector within the minimum hypersphere or not. If there is only one feature vector within the minimum hypersphere, the hypersphere center determination unit 2026 may determine the feature vector as the center of the maximum hypersphere. If there are more than one feature vectors within the minimum hypersphere, the hypersphere center determination unit 2026 estimates the center of the minimum hypersphere, which is then considered as the center of the maximum hypersphere.

In one embodiment, the decision hypersphere creation unit 2030 further comprises a maximum hypersphere surface area computation unit 2032 and a decision hypersphere determination unit 2034. The maximum hypersphere surface area computation unit 2032 may calculate the surface area of the maximum hypersphere created by the maximum hypersphere creation unit 2010. The decision hypersphere determination unit 2034 may determine a decision hypersphere such that the center of the decision hypersphere is the calculated center of the maximum hypersphere, and the ratio of the surface area of the decision hypersphere and the surface area of the maximum hypersphere calculated by the maximum hypersphere surface area computation unit 2032 is a predetermined value.

In one embodiment, a kernel function $K(\bullet)$ is employed in the maximum hypersphere creation unit 2010, the center calculation unit 2020, and the decision hypersphere creation unit 2030. The kernel function is selected to be fixed for an arbitrary normalized feature vector z in the feature space. For example, the kernel function $K(\bullet)$ may comprise Histogram Intersection Kernel.

Figure 11:
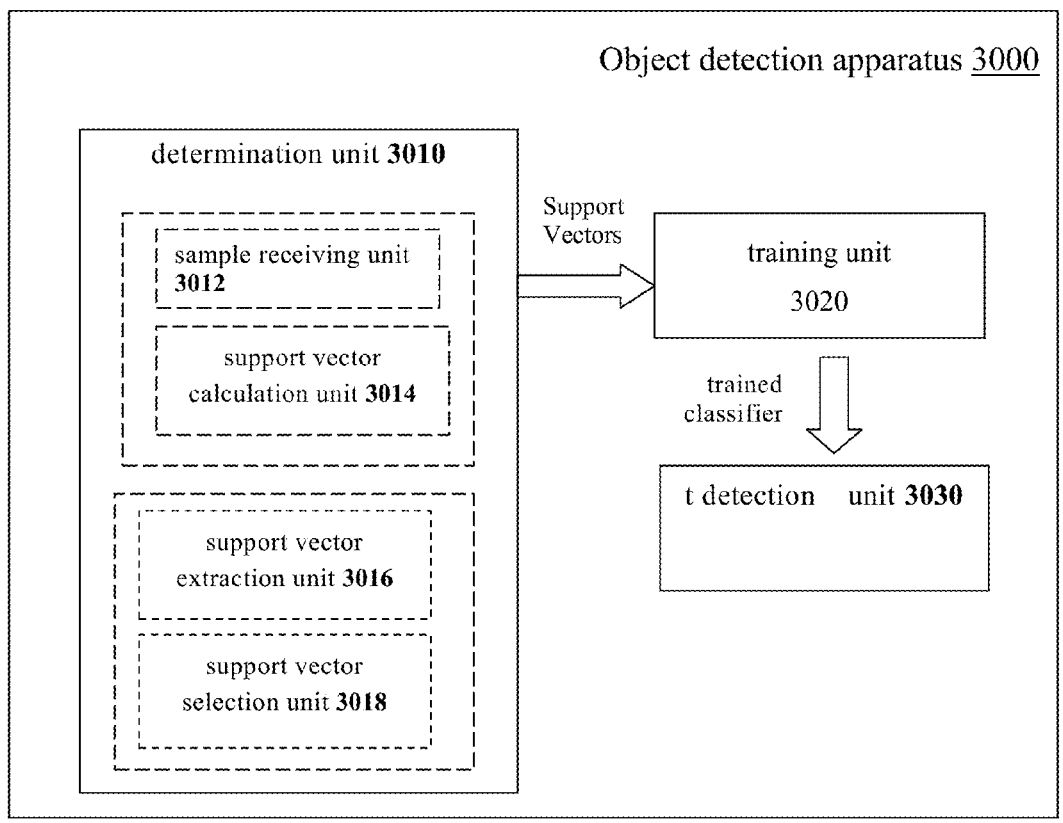
FIG. 11 is a functional block diagram showing an object detection apparatus according to embodiments of this disclosure.

FIG. 11 shows a functional block diagram of an object detection apparatus 3000 according to embodiments of this disclosure. The function modules of the object detection apparatus 3000 may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

The object detection apparatus 3000 may comprise a determination unit 3010, a training unit 3020, and a detection unit 3030.

The determination unit 3010 may determine a set of support vectors. In one embodiment, the determination unit 3010 may comprise a sample receiving unit 3012 for receiving one or more samples, and a support vector calculation unit 3014 for calculating the set of support vectors based on the samples received by the sample receiving unit 3012. Alternatively and additionally, the determination unit 3010 may comprise a support vector extraction unit 3016 for extracting support vectors from other trained classifiers, and a support vector selection unit 3018 for selecting a set of support vectors based on the support vectors of the trained classifiers extracted by the support vector extraction unit 3016.

The training unit 3020 may train a classifier through the classification method of FIG. 4 using the set of support vectors determined by the determination unit 3010. The detection unit 3030 may detect an object from images or videos using the trained classifier.

Figure 12:
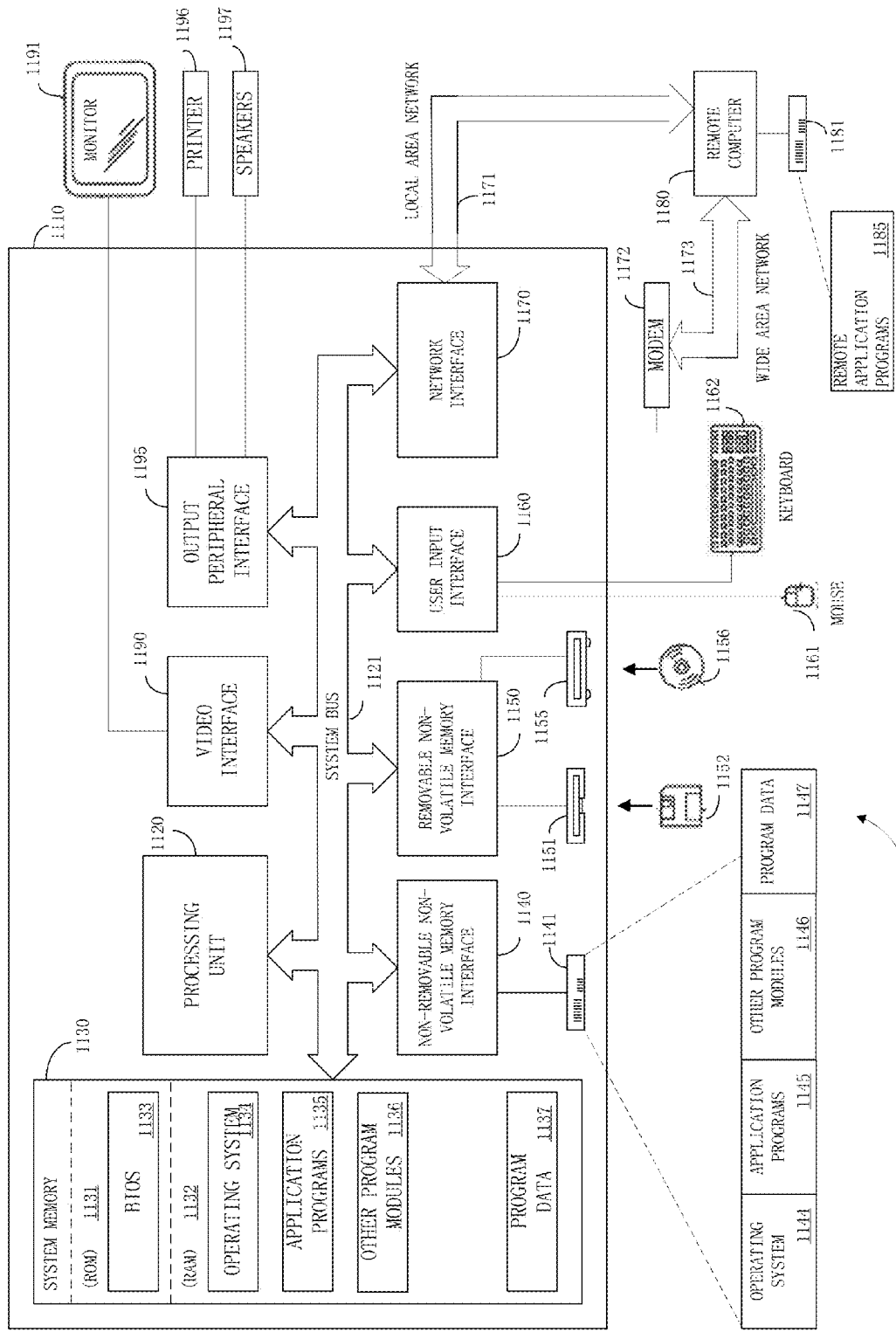
FIG. 12 is a block diagram showing a hardware configuration of a computer system where embodiments of this disclosure can be implemented.

FIG. 12 is a block diagram showing an example of a hardware configuration of a computing system 1000 which can be used to implement the embodiments of the present invention. For example, the computer system 1000 can be implemented as an image processing device, such as desktop computer, tablet computer, laptop computer, alarm device, smart phone, gaming machine, etc.

As shown in FIG. 12, the computing system comprises a computing device 1110. The computing device 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

For example, the object detection apparatus 3000 as described with respect to FIG. 11 can be stored in the system memory 1130 or the non-removable non-volatile memory 1141 as an application module.

Removable non-volatile memories, such as a floppy drive 1151 and a CD-ROM drive 1155, is connected to the removable non-volatile memory interface 1150. For example, a floppy disk can be inserted into the floppy drive 1151, and a CD (compact disk) can be inserted into the CD-ROM drive 1155.

Input devices, such a mouse 1161 and a keyboard 1162, are connected to the user input interface 1160.

The computing device 1110 can be connected to a remote computing device 1180 by the network interface 1170. For example, the network interface 1170 can be connected to the remote computing device 1180 via a local area network 1171. Alternatively, the network interface 1170 can be connected to a modem (modulator-demodulator) 1172, and the modem 1172 is connected to the remote computing device 1180 via a wide area network 1173.

The remote computing device 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computing system shown in FIG. 12 is merely illustrative and is in no way intended to limit the invention, its application, or uses.

The computer system shown in FIG. 12 can be implemented in any embodiment as a stand-alone computer or as a processing system in a device, from which one or more unnecessary components can be removed, or one or more additional components can be added.

In one example, a user of the computer system 1000 can interact with the computer system 1000 through an input device, such as the keyboard 1162, to identify one or more image samples stored in, for example, the non-removable non-volatile memory 1141 as target object to be detected, and then specify a range of samples to be detected. Then, an object detection module stored in the system memory 1130 or the non-removable non-volatile memory 1141 learns according to the method shown in FIG. 4. Next, the target object is detected from the range of samples specified by the user using the learned object detection module. Finally, target objects detected from the range of samples are presented to the user.

Figure 13:
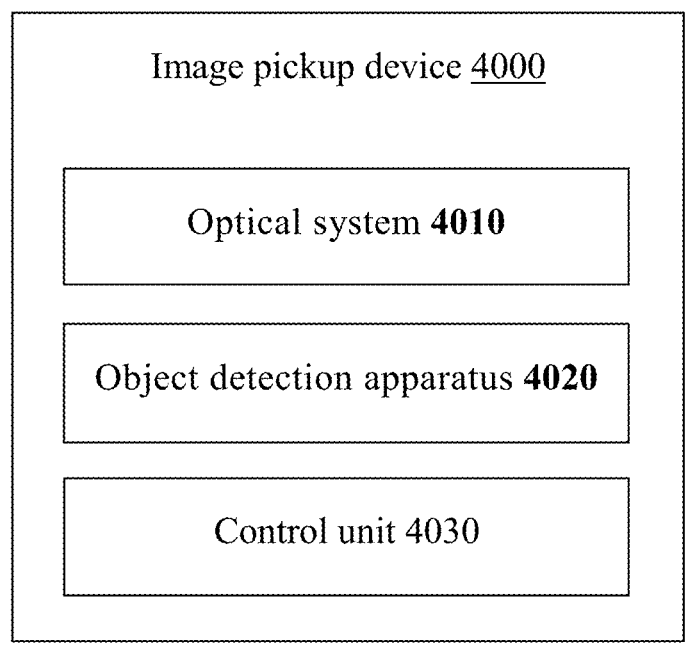
FIG. 13 is a functional block diagram showing an image pickup device where embodiments of this disclosure can be implemented.

FIG. 13 shows a functional block diagram of an image pickup device 4000 according to embodiments of this disclosure. For example, the image pickup device 4000 may be implemented as camera, video camera, etc. As shown in FIG. 13, the image pickup device 4000 comprises an optical system 4010 configured to pickup images or videos, an object detection apparatus 4020 operable according to the method of FIG. 8, and a control unit 4030 configured to control the optical system 4010 to focus on an object detected by the object detection apparatus 4020.

In one example, the user of the image pickup device 4000 may, after turning on the image pickup device 4000 and before taking a picture, specify one or more image samples stored in the storage device (not shown) of the image pickup device 4000 as a target object to be traced, then a classifier contained in the object detection apparatus 4020 is trained according to the method shown in FIG. 4. During taking a picture, the object detection apparatus 4020 can automatically search in preview images (for example, images present in the viewfinder of a camera) to determine whether a target object to be detected is contained therein, if so, locate the position of the target object. Finally, the control unit 4030 controls the optical system 4010 to focus on the target object detected by the object detection apparatus 4020. In another example, the specification of a target object by the user can be recorded in the storage device of the image pickup device 4000.

The method and apparatus of this invention can be implemented in many manners. For example, the method and apparatus of this invention can be implemented in software, hardware, or any combination thereof. The order of the steps of the method is merely illustrative, and the steps of the method of this invention are not limited to the specific order described above, unless explicitly stated otherwise. Further, in some embodiments, this invention can be implemented as a program recorded on a record medium, comprising machine readable instructions for implementing the method according to this invention. Thus, this invention also covers record mediums having a program for implementing the method according to this invention stored thereon.

Furthermore, the present invention also can be implemented in an image processing system, and the image processing system may particularly comprise a processor and a memory storing a program that causes the processor to execute the method of the present invention, that is, the classification method and/or the object detection method. Although some particular embodiments of this invention have been shown by means of examples, those skilled in the art may appreciate that the above examples are merely illustrative and are not intended to limit the scope of this invention. Those skilled in the art should understand that the above embodiments can be modified without departing from the scope and spirit of this invention. The scope of this invention is defined by the accompanying claims.

This application claims the benefit of patent application filed in the People's Republic of China, Application No. 201210049918.6, Serial No. 2012030100272140, filed Feb. 29, 2012, which is hereby incorporated by reference herein in its entirety.

What is claimed is:

1. A classification method in a feature space including one or more feature vectors, all of or some of the feature vectors being identified as support vector(s), comprising:
   creating a maximum hypersphere in the feature space, according to the support vector(s);
   creating a minimum hypersphere in the feature space according to the support vector(s);
   judging whether there is only one feature vector within the minimum hypersphere;
   determining only one feature vector as a center of the maximum hypersphere, if there is the only one feature vector within the minimum hypersphere;
   estimating a center of the minimum hypersphere as the center of the maximum hypersphere, if there are more than one feature vectors within the minimum hypersphere
   creating a decision hypersphere based on the calculated center of the created maximum hypersphere and the created maximum hypersphere; and
   classifying feature vector(s) within the decision hypersphere as positive feature vector(s).

2. The classification method according to claim 1, wherein the decision hypersphere is created to make probability of any positive feature vector(s) falling within the created decision hypersphere.

3. The classification method according to claim 1, wherein said creating the decision hypersphere comprises:
   computing a surface area of the maximum hypersphere; and
   determining a decision hypersphere so that a center is the determined or estimated center of the maximum hypersphere and a ratio between the surface areas of the decision hypersphere and the maximum hypersphere is a predetermined value.

4. The classification method according to claim 1, wherein the support vector(s) are pre-identified, or calculated based on the one or more feature vectors.

5. The classification method according to claim 1, wherein the maximum hypersphere is created by use of a Support Vector Data Description (SVDD) algorithm.

6. The classification method according to claim 1, wherein a kernel function $K(\bullet)$ is used in creating the maximum hypersphere, calculating a center, and creating the decision hypersphere, and wherein the kernel function is chosen so that $K(z,z)$ is constant for any one of normalized feature vectors $z$ in the feature space.

7. The classification method according to claim 6, wherein the kernel function $K(\bullet)$ includes Histogram Intersection Kernel (HIK).

8. A classification apparatus comprising:
   a processor; and
   a memory storing a program that causes the processor to execute the method according to claim 1.

9. An object detection method, comprising:
   determining a set of support vectors;
   training a classifier using the classification method according to claim 1, based on the set of support vectors determined in said determination step; and
   detecting an object from images or videos using the learned classifier.

10. The object detection method according to claim 9, wherein determining the set of support vectors comprises:
    receiving one or more samples; and
    calculating the set of support vectors based on the received samples.

11. The object detection method according to claim 9, wherein determining the set of support vectors comprises:
    extracting support vectors from other learned classifiers; and
    selecting the set of support vectors based on the extracted support vectors of learned classifiers.

12. An object detection apparatus, comprising:
    a processor; and
    a memory storing a program that causes the processor to execute the method according to claim 9.

13. An image pickup device, comprising:
    an optical system configured to pickup images or videos;
    the object detection apparatus according to claim 12; and
    a controlling unit configured to control said optical system to focus on the object detected by said object detection apparatus.

14. An image processing device, comprising:
    a memory storing images or videos; and
    the object detection apparatus according to claim 12, for detecting an object from the images or videos.

15. The image processing device according to claim 14, wherein said image processing device is any one selected from a group consisting of a desktop computer, a tablet computer, a laptop computer, an alarming device, a smart phone and a gaming machine.

16. A non-transitory computer readable storage medium storing a program that causes a computer to function as each unit of a classification apparatus of claim 8.

17. A non-transitory computer readable storage medium storing a program that causes a computer to function as each unit of an object detection apparatus of claim 12.

18. An image processing system, comprising
    a processor; and
    a memory storing a program that causes the processor to execute the method according to claim 1.

19. An image processing system, comprising
    a processor; and
    a memory storing a program that causes the processor to execute the method according to claim 9.

* * * * *